United States Patent Office 2,956,096
Patented Oct. 11, 1960

2,956,096

ISOMERIZATION OF PARAFFIN HYDROCARBONS

Alan Schriesheim, Fords, N.J., assignor to Esso Research and Engineering Company, a corporation of Delaware No Drawing. Filed Jan. 2, 1958, Ser. No. 706,563

8 Claims. (Cl. 260—683.75)

The present invention relates to improvements in the art of converting hydrocarbons to more valuable isomers and is particularly directed to the catalytic isomerization of straight chain paraffin hydrocarbons to the corresponding branched chain hydrocarbons. The invention is especially concerned with the isomerization of normal paraffin hydrocarbons of from 4 to 7 carbon atoms.

With the continued progress of the automotive industry there has been more and more emphasis on the use of gasoline engines with greater compression ratios to obtain higher efficiency. In order to satisfy the requirements of such engines it has been necessary for petroleum refiners to provide motor fuels of increasingly greater octane rating. Among the available processes that can be used for upgrading the light naphtha components of such fuels isomerization appears to be very valuable from an economic standpoint. Furthermore, it may be stated as a general proposition that the isoparaffinic and branched chain paraffin hydrocarbons are of greater commercial value to the petroleum industry than the corresponding normal or straight chain paraffin hydrocarbons. Thus for example 2,2-dimethyl butane has a higher octane rating than the isomeric normal hexane. Isobutane is more valuable than normal butane since the former can be used as the basis for the preparation of 8-carbon-atom branched chain hydrocarbons by alkylation with butylene.

The isomerization of normal paraffin hydrocarbons of from 4 to 7 carbon atoms to the corresponding branched chain homologs is well known. For effecting the isomerization it is customary to employ certain metal halides, particularly aluminum chloride or aluminum bromide, in conjunction with certain promoters such as hydrogen chloride, hydrogen bromide or boron fluoride. Insofar as the isomerization of the hydrocarbons in light naphthas is concerned, the lower the temperature of isomerization within limits the more favorable is the equilibrium for converting straight chain paraffin hydrocarbons into isomers of high octane rating. Aluminum bromide has been found to be more active than aluminum chloride at lower isomerization temperatures e.g. in the range of about 60° to about 120° F.

It is an object of the present invention to provide means for enhancing the activity of aluminum bromide as an isomerization catalyst for normal paraffin hydrocarbons of 4 to 7 carbon atoms, particularly pentane and hexane. In accordance with the present invention it has been found that the isomerization activity of aluminum bromide is markedly increased when the catalyst is associated with ferric iron, particularly ferric oxide. It is also an essential feature of the invention that the aluminum bromide be supported on, mixed with, or impregnated into a suitable support, both for the purpose of enhancing the activity of the catalyst as well as for the purpose of reducing its solubility in the hydrocarbons present during the reaction. The latter feature is important because large losses of catalyst in the product would add considerably to the cost of the process.

Among the supports or carriers that may be used in this invention are included activated carbon, activated alumina, pumice, silica gel, fuller's earth, various activated clays and calcined bauxite. Associated with the support and/or the catalyst, ferric iron must be present above a minimum amount, as set forth below. Ferric oxide or mixtures of it with other materials such as the supports mentioned above, may constitute the catalyst support. A particularly useful support is one consisting of about 70 to 85% $Al_2O_3$ and about 30 to 15% $Fe_2O_3$, prepared from the co-precipitated hydroxides followed by calcining, since on such a support the isomerization activity of the aluminum bromide is at a high level while the solubility of the aluminum bromide in the isomerized product is at a minimum.

To form the catalyst composition the aluminum halide may be mixed with the support and the mixture heated to effect impregnation of the support. Loosely held aluminum halide may then be removed by heating the mass and passing an inert gas therethrough, such as nitrogen, carbon dioxide, hydrogen or methane.

Alternatively the support may be impregnated by dissolving the aluminum halide in a suitable solvent such as ethylene dichloride or dioxane, for example, and the porous carrier impregnated with this solution, followed by heating to remove the solvent and loosely held aluminum halide. Still another alternative is to employ a powdered support or promoter, mix the aluminum halide with it, and compress the mixture into pellets.

The proportion of support to aluminum halide catalyst should be at least 2 to 1 by weight but from a practical standpoint should not exceed about 50 to 1. Stated conversely, the ratio of aluminum halide to support should be in the range of 2 to 50 parts of the halide for each 100 parts of support. The preferred range is from about 5 to 40 parts of aluminum halide per 100 parts of support.

As set forth hereinafter, the process constituting this invention consists in contacting normal paraffin hydrocarbons of from 4 to 7 carbon atoms in the liquid phase at temperatures in the range of about 60° to about 120° F., and preferably at a temperature no higher than 110° F., with a catalyst selected from the class consisting of aluminum bromide and mixtures of aluminum bromide and aluminum chloride wherein, on a batch operation basis, at least 3.5 weight percent of aluminum bromide is present, based on the hydrocarbon feed, and wherein, additionally, the percentage of aluminum bromide present, when added to 0.4 the percentage of aluminum chloride present, totals at least 8 percent based on the hydrocarbon feed. Additionally the catalyst is associated with a support in the ratio of from 2 to 50 parts of catalyst per 100 parts of support, and there is present at least 6 percent of ferric oxide, based on the weight of aluminum bromide present.

The process may be conducted either as a batch operation or as a continuous operation, the latter being preferred for economic reasons. In continuous operation, flow rates of from 0.2 to 1.5 v./v./hr. (volume of feed per volume of total catalyst, including support, per hour) may be used. The apparatus employed is of a conventional nature and may comprise a tower containing a fixed bed of the catalyst through which the reacting hydrocarbons are circulated, with an external recycle line to send the reactants back through the bed any number of times. A similar tower with a recycle line may be used for a slurry type of operation in which the suspension of catalyst and hydrocarbons is recirculated through the tower, which in this case will have baffle plates or similar mixing plates, or some other means of agitation, such as a mechanical stirrer or a simple mixing pump. Alternatively, the reactor may be a simple mechanically stirred reactor containing the mixture of catalyst and reacting hydrocarbons.

Where slurry operation is used, the slurry is removed from the reactor at the end of the reaction period, in the case of batch operation, or as a small sidestream in the case of continuous operation, and sent to suitable separation equipment, as for example a simple settling tank, a centrifuge, or a filter, or suitable combinations of such equipment, to separate the catalyst from the hydrocarbons. Dissolved aluminum halide is removed by distillation of the product, the catalyst remaining with the bottoms.

Alternatively, dissolved halide can be removed by percolating the product through an adsorbent such as bauxite, diatomaceous earth or charcoal, or by chilling the product to temperatures as low as −30° F. in a heat exchanger and separating the halide by filtration. To aid crystallization, a portion of the exit stream from the heat exchanger can be recycled to mix with the product stream going into the heat exchanger, thereby furnishing crystal nuclei for further crystallization. By employing two filters in parallel, operating alternately, the aluminum halide that accumulates on the filters can be recovered by passing warm feed through the filter not being used for catalyst removal.

The slow solubility of the halide in the reacting hydrocarbons or in the product can be compensated for by adding make-up halide to the feed stream. When conventional promoters such as HF, $BF_3$, HBr or HCl, or cracking inhibitors such as naphthenes are used, these can be added along with the feed. These are usually employed in amounts of about 1 to 10% based on the feed.

Aromatics and other materials that tend to be detrimental to the isomerization reaction may be removed by conventional means such as acid treating, mild hydrogenation, or the like. If such deleterious materials are present in only small quantities the feed may be treated to remove them by contacting the contaminated feed with a spent Friedel-Crafts catalyst such as spent $AlBr_3$ on calcined bauxite. The contacting may be effected by percolation, or vaporization of the feed through the spent catalyst or by a slurry contacting operation, followed by filtration.

The following examples serve to illustrate the advantages of this invention.

EXAMPLE 1

The relative effectiveness of a number of materials as promoters for aluminum bromide isomerization catalysts was compared in the following manner. A measured quantity of the hydrocarbon to be isomerized was placed in a reaction vessel after which measured amounts of aluminum bromide and of the promoter material being tested were also placed in the vessel. The mixture of hydrocarbon, catalyst and promoter was stirred at room temperature and at atmospheric pressure for the entire period of each run. At the end of the run the aluminum bromide was carefully decomposed with water, after which the hydrocarbon layer was separated from the water layer, washed with dilute alkali and then with distilled water and finally dried over calcium chloride. The recovered hydrocarbons were then analyzed to determine the extent of isomerization that had been obtained.

In the manner just described, ferric oxide, a mixed aluminum oxide and ferric oxide, various aluminas, titanium dioxide, ruthenium oxide and a mixed aluminum oxide and silicon dioxide were compared. All of the promoters were materials of high purity available commercially, with the exception of the mixed aluminum oxide and ferric oxide. The latter was prepared by coprecipitating ferric hydroxide with aluminum hydroxide and calcining the resulting mixture at 1100° F.

In each of the runs the hydrocarbon to be isomerized consisted of 95% hexane and 5% methyl cyclopentane, the latter being present to prevent cracking of the hydrocarbons. Each run was conducted for 4 hours at 80° F. at atmospheric pressure and in each case 40 grams of promoter were used for each 100 grams of hydrocarbon feed. The results obtained in these runs are presented in Table I.

*Table I*

| Catalyst Promoter | $Fe_2O_3$ | 80% $Al_2O_3$ 20% $Fe_2O_3$ | 87% $Al_2O_3$ 13% $SiO_2$ | $TiO_2$ | $RuO_2$ | Eta Alumina | Gamma Alumina | $Al_2O_3 \cdot 3H_2O$ |
|---|---|---|---|---|---|---|---|---|
| Grams $AlBr_3$/100 g. Promoter | 37 | 50 | 50 | 61.3 | 44.6 | 50 | 50 | 50 |
| Percent Conversion | 94 | 86 | 37 | 20 | 9 | 5 | 11 | 35 |
| 2,2-Dimethyl Butane in product, percent | 50.8 | 48.0 | 1.9 | 1.1 | 0.7 | 0.1 | 0.4 | 3.7 |

It will be noted from the results that ferric oxide is an excellent promoter for aluminum bromide isomerization catalyst, since in those runs where it was used from 86 to 94 percent conversion was obtained, with a yield of from 48 to 51 percent of the most desired isomer, namely 2,2-dimethyl butane. The other supports give only from 5 to 37 percent conversion and at the most less than 4 percent of the latter isomer. For a commercially useful process at least 75 percent conversion is desirable.

EXAMPLE 2

The activity of ferric oxide as a promoter for aluminum bromide in isomerization reactions was compared with the activity of oxides of other metals in a manner similar to that of Example 1. The metals investigated were those close to iron in atomic number. The runs were made in the same manner as in Example 1 using a feed consisting of 94 vol. percent of normal hexane and 6 vol. percent of methyl cyclopentane. The reaction temperature was 74° F., atmospheric pressure was used and each run was conducted for 4 hours. For each 100 grams of metal oxide, 30 grams of aluminum bromide were employed and 40 grams of metal oxide were employed for each 100 grams of hydrocarbon feed. The results obtained, expressed as the volume percent of normal hexane converted, are presented in Table II. It will be noted that ferric oxide was outstanding as a promoter, giving almost 80% conversion as compared to less than 50% for any of the other oxides.

*Table II*

COMPARISON OF METAL OXIDES AS PROMOTERS FOR $AlBr_3$ IN ISOMERIZATION

| Element | Atomic Number | Oxide Used | Percent n-Hexane Converted |
|---|---|---|---|
| Chromium | 24 | $Cr_2O_3$ | 35 |
| Manganese | 25 | $MnO_2$ | 44 |
| Iron | 26 | $Fe_2O_3$ | 78 |
| Cobalt | 27 | $Co_2O_3$ | 49 |
| Nickel | 28 | $Ni_2O_3$ | 45 |
| Copper | 29 | CuO | 25 |

EXAMPLE 3

In a manner similar to that of the previous examples, a series of runs were made to investigate the effect of various catalyst-to-feed ratios on the isomerization of normal hexane. In each of these runs the feed consisted of 95 vol. percent of normal hexane and 5 vol. percent of methylcyclopentane. The operating conditions were atmospheric pressure and 80° F. Each run was conducted for 4 hours. In each run 40 grams of support were used for each 100 grams of feed, while the amount of aluminum bromide on the support differed in the various runs. Approximately 2 weight percent of Fe₂O₃ was present in the support, which consisted of calcined bauxite. The results obtained in the various runs are presented in Table III which also sets forth the ratio of aluminum bromide to support in each of the runs.

It will be seen from the results given in Table III that for at least about 75% conversion the ratio of aluminum bromide to feed should be at least 8 parts per 100 and that additionally it is necessary that the ratio of Fe₂O₃ to aluminum bromide should be at least 6%.

*Table III*

EFFECT OF RATIOS OF ALUMINUM BROMIDE TO FEED AND OF Fe₂O₃ TO ALUMINUM BROMIDE ON HEXANE ISOMERIZATION

| AlBr₃ on Support, g./100 g. | Support | Ratio, AlBr₃ to Feed g./100 g. | Ratio, Fe₂O₃ to AlBr₃, Percent | Percent Conversion | Percent 2,2-DMB in Product |
|---|---|---|---|---|---|
| 12.0 | Bauxite ᵃ | 4.8 | 16 | 8.8 | |
| 18.5 | ---- do ---- | 7.4 | 11 | 40.7 | 4.1 |
| 20.1 | Fe₂O₃ ᵇ | 8.0 | 500 | 74.3 | 25.8 |
| 26 | Bauxite ᵃ | 11.4 | 8 | 92.5 | 41.8 |
| 30.1 | ---- do ---- | 12.0 | 6 | 93.6 | 46.2 |
| 37.1 | Fe₂O₃ ᵇ | 14.8 | 300 | 94.1 | 50 |
| 50 | Bauxite ᵃ | 20 | 40 | 92.7 | 42.6 |
| 50 | Al₂O₃.Fe₂O₃ ᶜ | 20 | 400 | 92.6 | 48 |
| 50 | Al₂O₃.SiO₂ ᵈ | 20 | 0 | 37 | 1.9 |
| | None ᵉ | 26.7 | 3.5 | 32.2 | 1.8 |

ᵃ 2% Fe₂O₃ present.
ᵇ 100% Fe₂O₃.
ᶜ 20% Fe₂O₃ present.
ᵈ No iron present.
ᵉ No support; 1% BF₃ present as promoter, 1% Fe₂O₃ present based on feed.

EXAMPLE 4

Using the same feed in the same reaction conditions as in Example 3 another series of 4 hour runs were made in which a portion of the aluminum bromide was replaced with aluminum chloride in various ratios. The results obtained are given in Table IV.

*Table IV*

EFFECT OF ALUMINUM BROMIDE-ALUMINUM CHLORIDE RATIOS ON HEXANE ISOMERIZATION

| Total Halide on Support, g./100 g. | | Ratio of Halide to Feed, g./100 g. | | Ratio Fe₂O₃ to AlBr₃, Percent | Percent Conversion | Percent 2,2-DMB in Product |
|---|---|---|---|---|---|---|
| AlBr₃ | AlCl₃ | AlBr₃ | AlCl₃ | | | |
| 5 | 91.2 | 2 | 36 | 40 | 63.2 | 14.5 |
| 6.2 | 31.2 | 2.5 | 12 | 32 | 65.1 | 16.6 |
| 9.5 | 90.0 | 3.8 | 36 | 21 | 93.7 | 45.8 |
| 11.9 | 45.4 | 4.8 | 18.1 | 16.8 | 86.9 | 34.6 |
| 14.0 | 10.0 | 5.6 | 4 | 14.3 | 67.3 | 13.7 |
| 14.0 | 15.1 | 5.6 | 6 | 14.3 | 77.9 | 25.6 |
| 14.5 | 28.7 | 5.8 | 11.5 | 13.8 | 92.0 | 46.2 |

The data in Table IV establish that a portion of the aluminum bromide may be replaced with aluminum chloride and still retain high isomerization activity, provided that at least 3.5 wt. percent of aluminium bromide is present based on the hydrocarbon feed and provided additionally that the percentage of aluminum bromide when added to 0.4 times the percentage of aluminum chloride present totals at least 8% based on the hydrocarbon feed. It will be noted that in each instance the amount of Fe₂O₃ present was more than the minimum established as necessary by the data in Table III.

The above limitations respecting the replacement of a portion of the aluminum bromide with aluminum chloride were arrived at by comparing the data for attained conversions of at least 75% with the data for conversions that were less than that figure. Thus when only 2 to 2.5% of aluminum bromide was present based on the feed, the conversion was only 63 to 65% even though from 4 to 18 times as much aluminum chloride was present as aluminum bromide. With a ratio of aluminum bromide to feed of 3.8 grams per 100 grams the conversion was 93.7%. In this case there was 9 times as much aluminum chloride present as aluminum bromide. On the other hand, with 5.6 parts of aluminum bromide per 100 parts of feed and only 4 parts of aluminum chloride per 100 parts of feed, the attained conversion was only 67.3%. With the same ratio of 5.6 parts of aluminum bromide per 100 parts of feed but with 6 parts of aluminum chloride instead of 4 parts, the attained conversion was raised to 77.9%. More importantly, the amount of 2,2-dimethylbutane in the product was doubled.

In an additional test at 80° F. using 6.3 parts of AlBr₃ and 19.2 parts of AlCl₃ per 100 parts of feed, the mixed catalyst being supported on 48.5 parts of calcined bauxite per 100 parts of feed, 2% Fe₂O₃ being present based on the bauxite, normal pentane was isomerized to the extent of 89 percent at 3 hours and to the extent of 92.6 percent at 4 hours.

The use of aluminum chloride to replace a portion of the aluminum bromide has a two-fold advantage in that the chloride is generally lower in cost than the bromide and in that the solubility of the bromide in the reacting hydrocarbons is reduced when the mixed chloride and bromide is used. When the mixed chloride-bromide is used a preferred range of proportions is 1 to 3 parts of the chloride for each part of the bromide.

It is to be understood that the above description and examples have been presented primarily for the purpose of illustrating the invention and that its scope is not to be limited thereto but is to be determined by the appended claims.

What is claimed is:

1. A process for converting normal paraffin hydrocarbons of from 4 to 7 carbon atoms to the corresponding isomers which consists in contacting said hydrocarbons in the liquid phase at a temperature in the range of from about 60° to about 120° F., with a supported catalyst selected from the class consisting of aluminum bromide and mixtures of aluminum bromide and aluminum chloride, wherein at least 3.5 weight percent of aluminum bromide is present based on the hydrocarbon feed and wherein additionally the percentage of aluminum bromide present, when added to 0.4 times the percentage of aluminum chloride present, totals at least 8 weight percent, based on the hydrocarbon feed, the ratio of aluminum halide to support being in the range of from 2 to 50 parts of halide for each 100 parts of support, said catalyst having associated therewith at least 6 percent of ferric oxide based on the weight of aluminum bromide.

2. Process as defined by claim 1 wherein the ratio of aluminum halide to support is in the range of 5 to 40 parts per 100 of support.

3. Process as defined by claim 1 wherein said support comprises calcined bauxite and iron oxide.

4. Process as defined by claim 1 wherein said support comprises a mixed aluminum oxide and ferric oxide, prepared by coprecipitation of the corresponding hydroxides, having from about 70 to 85 weight percent Al₂O₃ and from about 30 to 15 weight percent Fe₂O₃.

5. Process as defined by claim 1 wherein said support consists of ferric oxide.

6. Process as defined by claim 1 wherein said catalyst comprises a mixture of aluminum bromide and aluminum chloride, in which from 1 to 3 parts of aluminum chloride are present for each part of aluminum bromide.

7. Process as defined by claim 1 wherein hexane is isomerized.

8. Process as defined by claim 1 wherein aluminum bromide is used in the absence of aluminum chloride, the percentage of aluminum bromide being at least 8 weight percent based on the feed.

References Cited in the file of this patent

UNITED STATES PATENTS

| 2,406,622 | Mavity | Aug. 27, 1946 |
| 2,415,061 | De Simo et al. | Jan. 28, 1947 |
| 2,537,948 | Fawcett et al. | Mar. 16, 1948 |